United States Patent
Van De Beek (10) Patent No.: US 10,009,070 B2
(45) Date of Patent: Jun. 26, 2018

(54) LOAD-MODULATION DETECTION COMPONENT

(71) Applicant: NXP B.V.

(72) Inventor: Remco Van De Beek, Waalre (NL)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/642,527

(22) Filed: Jul. 6, 2017

(65) Prior Publication Data

US 2018/0034512 A1 Feb. 1, 2018

(30) Foreign Application Priority Data

Jul. 29, 2016 (EP) ..................................... 16181954

(51) Int. Cl.
*H04B 5/00* (2006.01)
*H04W 4/00* (2018.01)
*H04W 4/80* (2018.01)

(52) U.S. Cl.
CPC ......... *H04B 5/0068* (2013.01); *H04B 5/0031* (2013.01); *H04B 5/0062* (2013.01); *H04B 5/0081* (2013.01); *H04W 4/008* (2013.01); *H04W 4/80* (2018.02)

(58) Field of Classification Search
CPC ... H04W 4/008; H04B 5/0031; H04B 5/0037; H04B 5/0062; H04B 5/0068; H04B 5/0081; H04B 1/525; H02J 50/10; H02J 5/005; H02J 7/025; G06K 7/0008; G01S 13/758; H04L 25/0328
See application file for complete search history.

(56) References Cited

U.S. PATENT DOCUMENTS

| | | | |
|---|---|---|---|
| 6,028,503 A | * | 2/2000 | Preishuberpflugl .. G06K 7/0008 340/10.4 |
| 2007/0176674 A1 | | 8/2007 | Shioda |
| 2009/0026266 A1 | | 1/2009 | Raggam |
| 2012/0322399 A1 | | 12/2012 | Sheikholeslami |
| 2015/0065043 A1 | | 3/2015 | Heng et al. |
| 2017/0093222 A1 | * | 3/2017 | Joye ..................... H04B 5/0037 |

(Continued)

OTHER PUBLICATIONS

Lien, W.L. et al. "A Self-Calibrating NFC SoC with a Triple-Mode Reconfigurable PLL and a Single-Path PICC-PCD Receiver in 0.11 μm CMOS", IEEE International Solid-State Circuits Conference Digest of Technical Papers, pp. 158-159 (2014).

(Continued)

*Primary Examiner* — Thanh Le
(74) *Attorney, Agent, or Firm* — Rajeev Madnawat (57) ABSTRACT

A load-modulation detection component for an inductive coupling reader device. The load-modulation receiver device is arranged to receive an antenna voltage signal representative of a voltage across an antenna of the inductive coupling reader device and output at least one load-modulated signal. The load-modulation detection component comprises a down-converter component arranged to mix the antenna voltage signal with a down-conversion signal to generate a down-converted signal, a series capacitive component coupled in series between an output of the down-converter component and an output of the load-modulation receiver, and a switched capacitor resistor circuit coupled between the output of the load-modulation receiver and a first reference voltage.

12 Claims, 4 Drawing Sheets

(56) References Cited

U.S. PATENT DOCUMENTS

2017/0098962 A1\* 4/2017 Desrosiers .............. H02J 50/12
2017/0180166 A1\* 6/2017 Zhou ...................... H04B 1/525

OTHER PUBLICATIONS

Johns, D. et al. "Switched-Capacitor Circuits", 24 pgs., retrieved from the Internet at : http://www.eecg.toronto.edu/-johns/ece512/lecture notes/10 switched capacitor 2per page.pdf (Jan. 24, 2017).

\* cited by examiner

LOAD-MODULATION DETECTION COMPONENT

CROSS-REFERENCE TO RELATED APPLICATIONS

This application claims the priority under 35 U.S.C. § 119 of European Patent application no. 16181954.5, filed on Jul. 29, 2016, the contents of which are incorporated by reference herein.

FIELD OF THE INVENTION

This invention relates to a load-modulation detection component and in particular to a load-modulation detection component for an inductive coupling reader device.

BACKGROUND OF THE INVENTION

Applications such as RFID (Radio Frequency Identification) and NFC (Near Field Communication) applications that make use of inductive receivers often have very low filter cut-off frequency requirements. There is typically a trade-off between silicon area required to implement a filter and the amount of data spectrum filtered off. As a result, conventional inductive receivers capable of achieving the required low filter cut-off frequencies for such applications require a large silicon area.

SUMMARY OF THE INVENTION

The present invention provides a load-modulation detection component and an inductive coupling reader device comprising a load-modulation detection component comprising such a load-modulation detection component as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
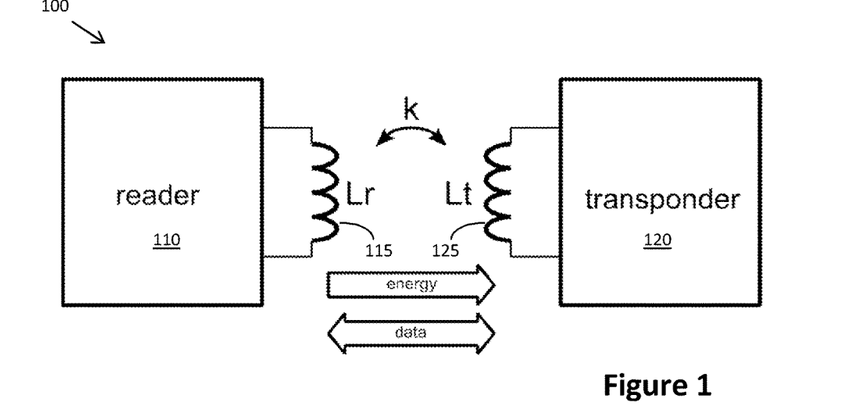
FIG. 1 illustrates a simplified block diagram of an inductively coupled reader-transponder system.

FIG. 1 illustrates a simplified block diagram of an inductively coupled reader-transponder system 100, such as may be used within a 125 kHz inductive coupling system, a Near Field Communication (NFC) system, a Radio Frequency Identification (RFID) system, a vehicle immobilisation system, or the like.

Such an inductively coupled reader-transponder system 100 is asymmetric in build-up. A reader device 110 comprises a power supply (not shown) such as a mains connection or a battery, whereas a transponder 120 does not. The transponder device 120 instead uses a magnetic field generated by the reader device 110 as its power source. To this end, the reader device 110 emits an AC magnetic field at least for the duration of the communication between the devices 110, 120. Energy transfer can take place thanks to the magnetic coupling (mutual inductance) between an inductive loop antenna (illustrated generally at 115) of the reader device 110 and an inductive loop antenna (illustrated generally at 125) of the transponder device 120.

The way the devices 110, 120 communicate to their counterpart is also asymmetric. The reader device 110, when it needs to convey a message to the transponder device 120, modulates its magnetic field, typically in the amplitude domain (AM of the magnetic carrier). The transponder device 120, on the other hand, uses load-modulation whereby the transponder device 120 modulates the load it presents to its inductive antenna.

Figure 2:
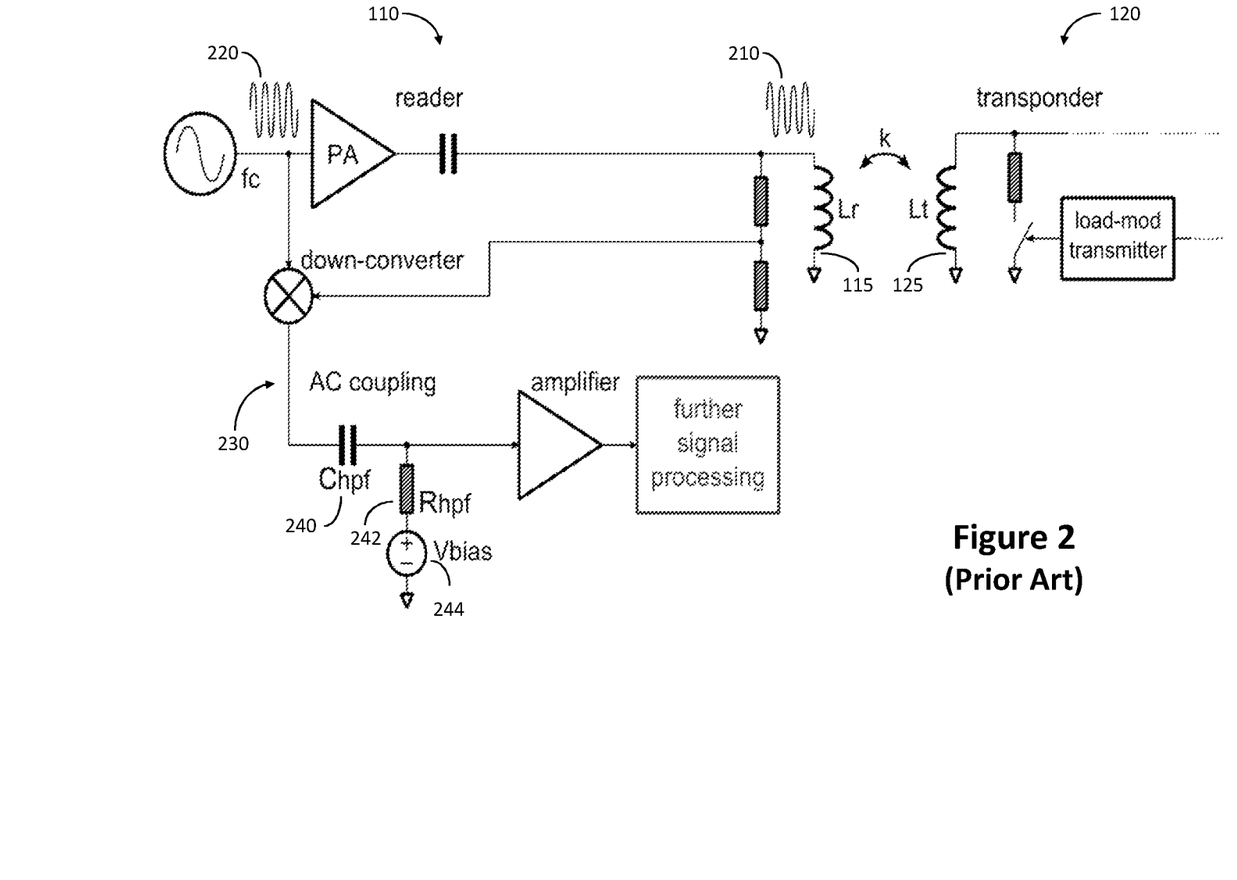
FIG. 2 schematically illustrates a simplified block diagram of a conventional reader device adapted to detect a load-modulated signal.

FIG. 2 schematically illustrates a simplified block diagram of a conventional reader device 110 adapted to detect a load-modulated signal. The reader device 110 is able to detect the load-modulated signal by sensing the voltage across its antenna 115. The carrier signal that the reader device 110 provides at its antenna 115 while the load-modulation process takes place is generally much stronger than the load-modulation signal on that same antenna 115. To that end, the load-modulation is typically performed in a DC-free manner (for example by employing Manchester coding of the switch control data). In this manner, the load-modulation data may be separated from the carrier signal in the frequency domain, enabling the reader device to suppress the carrier signal without affecting the received load-modulation data.

Figure 4:
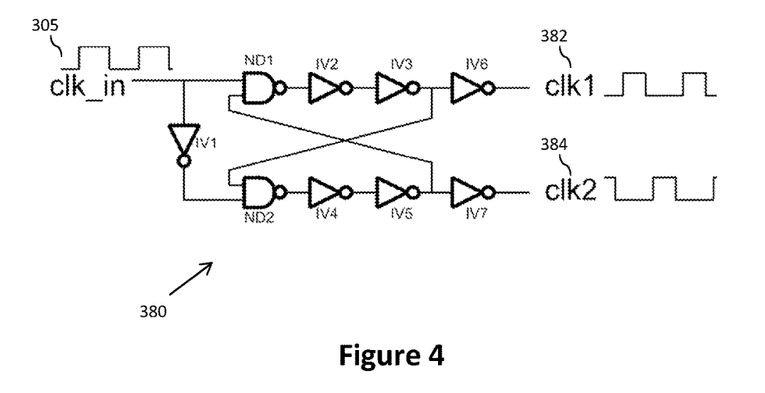
FIG. 4 illustrates a simplified block diagram of an example implementation of a clock generator component.

The carrier signal may be suppressed by first down-converting the antenna signal 210 with the carrier clock 220 (which has a frequency equal to the carrier signal). This translates the antenna signal 210 in the frequency domain, such that the carrier signal is shifted down to 0 Hz. The carrier signal (now at 0 Hz) may then be removed from the down-converted signal 230 by applying a high-pass filter. As illustrated in FIG. 4, a conventional technique is to use AC coupling consisting of a capacitance 240 coupled in series and a shunt resistance 242 coupled to a bias voltage 244 (which is required in practical implementations in order to DC-bias a succeeding amplifier input signal at a well-defined voltage Vbias). The filtered signal 250 may then be amplified and further processing performed on the remaining load-modulation signal.

A problem with this conventional architecture is the use of the AC coupling capacitance Chpf 240 and resistance Rhpf 242 to perform the high pass filtering. The combination of these elements provides a cut-off frequency $f\_co = 1/(2\pi \cdot Rhpf \cdot Chpf)$ Hz, below which the down-converted signal 230 is strongly attenuated. This cut-off frequency needs to be sufficiently low to prevent distortion of the load-modulation signal. A low cut-off frequency requires a large product of Rhpf and Chpf. However, such a large Rhpf·Chpf product requires a large amount of silicon area when fully integrated in a semiconductor device. In particular, realizing a large resistance requires a large area since it is typically realized by a (meandering) resistive line that has a limited resistance per unit length, whilst realizing a large capacitance requires a large area because it is typically realized by structures that have a limited amount of capacitance per unit area.

Figure 3:
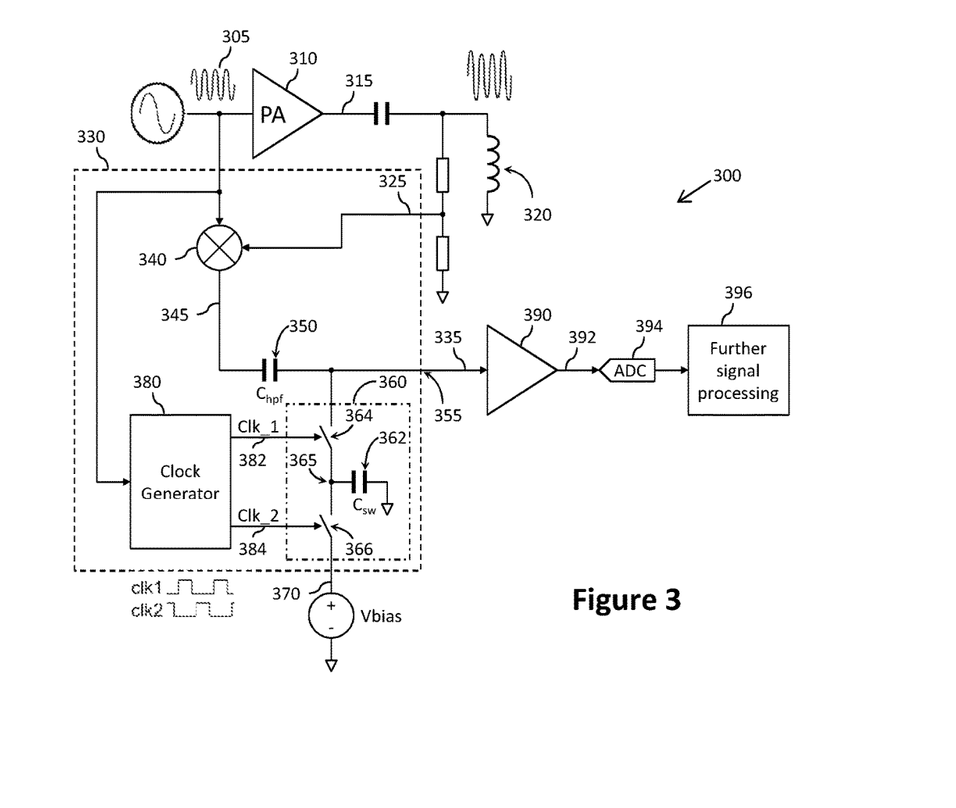
FIG. 3 schematically illustrates a simplified block diagram of an example embodiment of an inductive coupling reader device.

FIG. 3 schematically illustrates a simplified block diagram of an example embodiment of an inductive coupling reader device 300. The inductive coupling reader device 300 comprises a power amplifier component 310 arranged to receive a carrier frequency reference signal 305, and amplify the carrier frequency reference signal 305 to generate a carrier signal 315, which is applied to an antenna 320 of the inductive coupling reader device 300. The inductive coupling reader device 300 comprises a load-modulation detection component 330. The load-modulation detection component 330 is arranged to receive an antenna voltage signal 325 representative of a voltage across the antenna 320 of the inductive coupling reader device 300 and to output a load-modulated signal 335 representative of a load-modulation at a transponder device inductively coupled to the reader device 300.

The load-modulation detection component 330 comprises a down-converter component 340 arranged to mix the antenna voltage signal 325 with a down-conversion signal to generate a down-converted signal 345. In the example illustrated in FIG. 3, the down-conversion signal comprises the carrier frequency reference signal 305. In this manner, a carrier signal component of the antenna voltage signal 325 is down-converted to 0 Hz within the down-converted signal 345.

The load-modulation detection component 330 further comprises a series capacitive component 350 coupled in series between an output of the down-converter component 340 and an output 355 of the load-modulation receiver 330, and a switched capacitor resistor circuit 360 coupled between the output 355 of the load-modulation receiver 330 and a first reference voltage, which in the illustrated example comprises a bias reference voltage 370.

For the example illustrated in FIG. 3, the switched capacitor resistor circuit 360 comprises a switched capacitive component 362 comprising a first terminal coupled to a switched node 365 and a second node coupled to a second reference voltage, which in the illustrated example comprises a ground reference voltage. A first switching device 364 of the switched capacitor resistor circuit 360 is coupled between the switched node 365 and the output 355 of the load-modulation detection component 330 and controllable by a first clock signal 382 to alternately couple and decouple the switched node 365 to the output 355 of the load-modulation detection component 330. A second switching device 366 of the switched capacitor resistor circuit 360 is coupled between the switched node 365 and the bias reference voltage 370 and controllable by a second clock signal 384 to alternately couple and decouple the switched node 365 to the bias reference voltage 370 when the switched node 365 is decoupled from the output 355 of the load-modulation detection component 330. In this manner, the switched node 365 is alternately coupled to the output 355 of the load-modulation detection component 330 at a frequency $f_{clk}$ of the clock signals 382, 384.

The current through the switched capacitor resistor circuit 360 may be defined by Equation 1 below:

$$I = C_{sw} \cdot (V_{in} - V_{out}) \cdot f_{clk} \qquad \text{Equation 1}$$

where $C_{sw}$ is the switched capacitor value, $V_{in}$ is the input voltage (i.e. the voltage at the output 355 of the load-modulation detection component 330) and $V_{out}$ is the output voltage (i.e. the bias reference voltage 370). From Equation 1, the resistance of the switched capacitor resistor circuit 360 may be represented as:

$$R = V/I = (V_{in} - V_{out})/C_{sw} \cdot (V_{in} - V_{out}) \cdot f_{clk} = 1/C_{sw} f_{clk} \qquad \text{Equation 2}$$

Accordingly, the series capacitance 350 and the switched capacitor resistor circuit 360 provide a high pass filter for the down-converted signal having a cut-off frequency f_co defined by:

$$f\_co = 1/(2\pi \cdot R \cdot C_{hpf}) = f_{clk} \cdot C_{sw}/(2\rho \cdot C_{hpf}) \qquad \text{Equation 3}$$

Significantly, the cut off frequency f_co is not set by an RC product, but rather by a capacitance ratio and switching frequency of the clock signals 382, 384. As a result, the high pass filter arrangement of the load-modulation detection component 330 illustrated in FIG. 3 does not suffer from the large silicon area requirements for achieving a low cut-off frequency that the conventional implementation suffers from.

In accordance with some example embodiments, the clock signals 382, 384 used for controlling the switching devices 364, 366 of the switched capacitor resistor circuit 360 comprise non-overlapping duty cycles such that the switching devices 364, 366 are not closed at the same time to prevent the output 355 of the load-modulation detection component 330 from being coupled directly to the bias reference voltage 370. For example, the clock signals 382, 384 used for controlling the switching devices 364, 366 of the switched capacitor resistor circuit 360 may each comprise a duty cycle of less than 50%, and may be offset by approximately 180° with respect to one another. In the example illustrated in FIG. 3, the clock signals 382, 384 used for controlling the switching devices 364, 366 of the switched capacitor resistor circuit 360 are generated by a clock generator component 380. In the illustrated example, the clock generator component 380 is arranged to receive the carrier frequency reference signal 305, and to generate the clock signals 382, 384 based on the carrier frequency reference signal 305. In this manner, a separate seed clock signal is not required to be provided for generating the clock signals 382, 384.

FIG. 4 illustrates a simplified block diagram of an example implementation of the clock generator component 380. The input clock signal clk_in, which in the illustrated example comprises the carrier frequency reference signal 305 having a duty cycle of 50%, is used to generate the non-overlapping the clock signals 382, 384 having duty cycle of less than 50%). NAND gates ND1, ND2 form a set-reset flip-flop structure, with inverters IV2, IV3, IV4 and IV5 adding extra delay within the flip-flop. Inverters IV6 and IV7 are output drivers for the clock signals 382, 384.

Referring back to FIG. 3, the inductive coupling reader device 300 further comprises an amplifier component 390 arranged to receive the load-modulated signal 335 output by the load-modulation detection component 330, and to output an amplified load-modulated signal 392.

Figure 5:
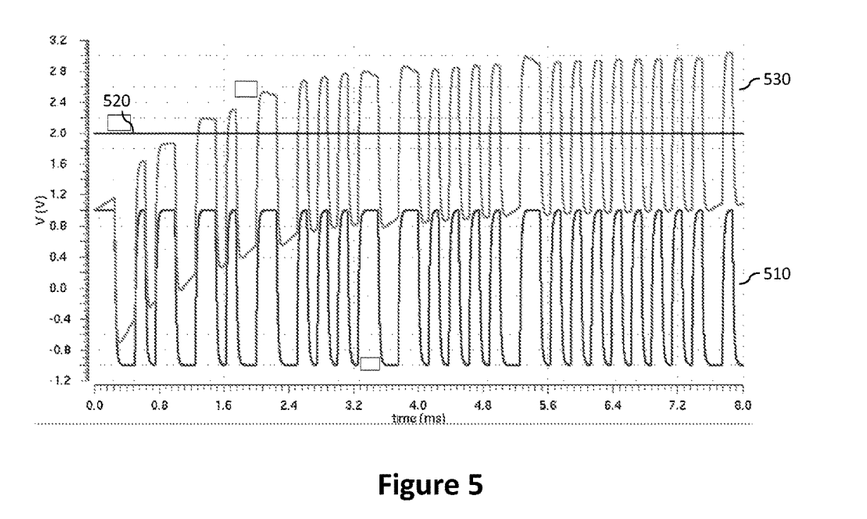
FIG. 5 illustrates a graph of voltage over time showing simulated voltage levels within a load-modulation detection component.

FIG. 5 illustrates a graph of voltage over time showing simulated voltage levels within the load-modulation detection component 330. The simulated voltage levels shown in FIG. 5 were achieved using a series capacitance 350 of 5 pF, a switched capacitance 362 of 25 fF and a switching frequency fc$_{lk}$ of 125 kHz, resulting in a cut-off frequency of approximately 100 Hz. Notably, to achieve a similar cut-off frequency of 100 Hz using, for example, a resistor of 25M Ω and a capacitor of 60 pF would require factors more silicon area to implement.

A first plot 510 illustrates the voltage over time for the down-converted signal 345 output by the down converter component 340. In this illustrated example, the down-converted signal 345 was generated by mixing the antenna voltage signal 325 with the carrier frequency reference signal 305, resulting in the down-converted signal 345 having an average DC voltage of 0V. A second plot 520 illustrates the bias reference voltage 370, which in the illustrated example was set to 2V (which may be the appropriate bias voltage for the amplifier component 390). A third plot 530 illustrates the voltage over time for the load-modulated signal 335 output by the load-modulation detection component 330. Advantageously, and as illustrated by the plot 530, the DC voltage of the load-modulated signal 335 is adjusted over time to match the bias reference voltage 370 with a time constant slow enough not to distort the data signal significantly.

Referring back to FIG. 3, in the illustrated example the inductive coupling reader device 300 further comprises an analogue-to-digital converter 394 arranged to convert the amplified load-modulated signal 392 from an analogue to a digital signal for further processing, for example as illustrated generally at 396.

Figure 6:
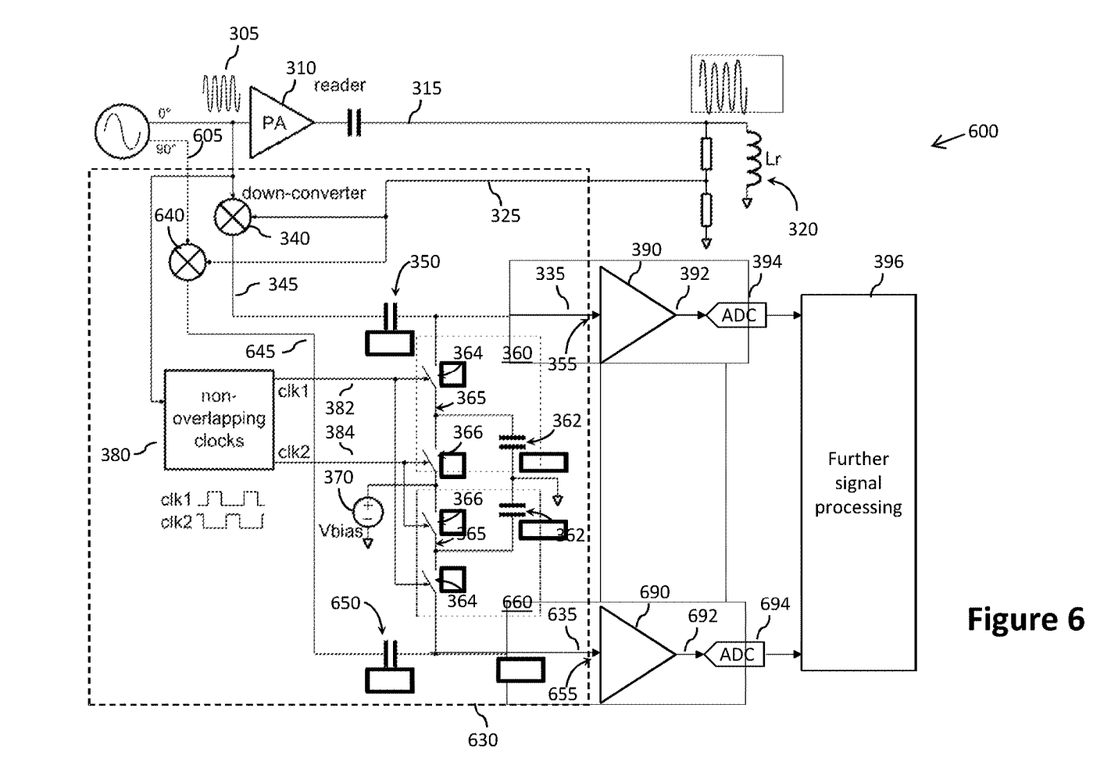
FIG. 6 schematically illustrates a simplified block diagram of an alternative embodiment of an inductive coupling reader device.

FIG. 6 schematically illustrates a simplified block diagram of an alternative embodiment of an inductive coupling reader device 600. For the example illustrated in FIG. 6, the inductive coupling reader 600 comprises a load-modulation detection component 630 arranged to detect a load-modulation signal both in amplitude (AM) and phase (PM) domain. The load-modulation detection component 630 illustrated in FIG. 6 differs from the load-modulation detection component 330 of FIG. 3 in that the load-modulation detection component 630 of FIG. 6 further comprises a second down-converter component 640 arranged to mix the antenna voltage signal 325 with a 90° phase shifted quadrature carrier frequency reference signal 605 to generate a quadrature down-converted signal 645.

The load-modulation detection component 630 of FIG. 6 further comprises a second series capacitive component 650 coupled in series between an output of the second down-converter component 640 and a second output 655 of the load-modulation receiver 630, and a second switched capacitor resistor circuit 360 coupled between the output 355 of the load-modulation receiver 630 and the first reference voltage, which in the illustrated example comprises the bias reference voltage 370.

For the example illustrated in FIG. 6, the first and second switched capacitor resistor circuits 360, 660 each comprises a switched capacitive component 362 comprising a first terminal coupled to a switched node 365 and a second node coupled to a second reference voltage, which in the illustrated example comprises a ground reference voltage. A first switching device 364 of each switched capacitor resistor circuit 360, 660 is coupled between the respective switched node 365 and the respective output 355, 655 of the load-modulation detection component 330 and controllable by the first clock signal 382 to alternately couple and decouple the switched nodes 365 to the outputs 355, 655 of the load-modulation detection component 630. A second switching device 366 of each switched capacitor resistor circuit 360, 660 is coupled between the respective switched node 365 and the bias reference voltage 370 and controllable by the second clock signal 384 to alternately couple and decouple the respective switched node 365 to the bias reference voltage 370 when the switched node 365 is decoupled from the respective output 355, 655 of the load-modulation detection component 630. In this manner, the switched nodes 365 are alternately coupled to the respective outputs 355, 655 of the load-modulation detection component 630 at a frequency f$_{clk}$ of the clock signals 382, 384.

In the example illustrated in FIG. 6, the clock signals 382, 384 used for controlling the switching devices 364, 366 of the switched capacitor resistor circuits 360, 660 are generated by the clock generator component 380 based on the carrier frequency reference signal 305.

In the example illustrated in FIG. 6, the inductive coupling reader device 600 comprises a first amplifier component 390 arranged to receive a first (in-phase) load-modulated signal 335 from the first output 355 of the load-modulation detection component 630, and to output a first amplified (in-phase) load-modulated signal 392. The inductive coupling reader device 600 further comprises a second amplifier component 690 arranged to receive a second (quadrature) load-modulated signal 635 from the second output 655 of the load-modulation detection component 630, and to output a second amplified load-modulated signal 692.

In the illustrated example the inductive coupling reader device 600 of FIG. 6 further comprises analogue-to-digital converters 394, 964 arranged to convert the amplified load-modulated signals 392, 692 from analogue to digital signals for further processing, for example as illustrated generally at 396.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Moreover, the terms 'front,' 'back,' 'top,' 'bottom,' 'over,' 'under' and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A load-modulation detection component for an inductive coupling reader device, the load-modulation receiver device being arranged to receive an antenna voltage signal representative of a voltage across an antenna of the inductive coupling reader device and output at least one load-modulated signal; the load-modulation detection component comprises:
   a down-converter component arranged to mix the antenna voltage signal with a down-conversion signal to generate a down-converted signal;
   a capacitive component coupled in series between an output of the down-converter component and an output of the load-modulation receiver; and
   a switched capacitor resistor circuit coupled between the output of the load-modulation receiver and a first reference voltage.

2. The load-modulation detection component of claim 1, wherein the switched capacitor resistor circuit comprises:
   a switched capacitive component comprising a first terminal coupled to a switched node and a second node coupled to a second reference voltage;
   a first switching device coupled between the switched node and the output of the load-modulation detection component and controllable by a first clock signal to alternately couple and decouple the switched node to the output of the load-modulation detection component; and
   a second switching device coupled between the switched node and the first reference voltage and controllable by a second clock signal to alternately couple and decouple the switched node to the first reference voltage when the switched node is decoupled from the output of the load-modulation detection component.

3. The load-modulation detection component of claim 2, wherein the first and second clock signals comprise non-overlapping duty cycles.

4. The load-modulation detection component of claim 2, wherein the first and second clock signals comprise a duty cycle of less than 50%, and are offset by 180° with respect to one another.

5. The load-modulation detection component of claim 2, wherein the load-modulation detection component comprises a clock generator component arranged to receive a carrier frequency reference signal from which a carrier signal applied to the antenna of the inductive coupling reader device is derived, and to generate the first and second clock signals from the carrier frequency reference signal.

6. The load-modulation detection component of claim 2, wherein the first reference voltage comprises an output DC offset bias voltage and the second reference voltage comprises a ground reference voltage.

7. The load-modulation detection component of claim 1, wherein the down conversion signal comprises a frequency equal to the carrier frequency of the carrier signal applied to the antenna of the inductive coupling reader device.

8. The load-modulation detection component of claim 1 comprising:
   a first down-converter component arranged to mix the antenna voltage signal with an in-phase down-conversion signal to generate a first down-converted signal;
   a first series capacitive component coupled in series between an output of the first down-converter component and a first output of the load-modulation receiver;
   a first switched capacitor resistor circuit coupled between the first output of the load-modulation receiver and the first reference voltage;
   a second down-converter component arranged to mix the antenna voltage signal with a quadrature down-conversion signal to generate a second down-converted signal;
   a second series capacitive component coupled in series between an output of the second down-converter component and a second output of the load-modulation receiver; and
   a second switched capacitor resistor circuit coupled between the second output of the load-modulation receiver and the first reference voltage.

9. An inductive coupling reader device comprising a load-modulation detection component according to claim 1.

10. The inductive coupling reader device of claim 9 further comprising at least one amplifier component arranged to receive the at least one load-modulated signal output by the load-modulation detection component, and to output at least one amplified load-modulated signal.

11. The inductive coupling reader device of claim 10 further comprising at least one analogue-to-digital converter arranged to convert the at least one amplified load-modulated signal from an analogue to a digital signal for further processing.

12. The inductive coupling reader device of claim 9, wherein the inductive coupling reader device comprises an inductive coupling reader device for at least one of:
   a 125 kHz inductive coupling system;
   a RFID system;
   a near field communication, NFC, system; and
   a vehicle immobilisation system.

* * * * *